United States Patent
Sainomoto et al.

(10) Patent No.: US 7,570,017 B2
(45) Date of Patent: Aug. 4, 2009

(54) RECHARGEABLE BATTERY PACK FOR A POWER TOOL INCLUDING OVER-DISCHARGE PROTECTION

(75) Inventors: Yoshinori Sainomoto, Sanda (JP);
Toshiharu Ohashi, Maibara (JP);
Hiroshi Miyazaki, Hikone (JP)

(73) Assignee: Matsushita Electric Works, Ltd., Kadoma (JP)

( * ) Notice: Subject to any disclaimer, the term of this patent is extended or adjusted under 35 U.S.C. 154(b) by 206 days.

(21) Appl. No.: 11/599,416

(22) Filed: Nov. 15, 2006

(65) Prior Publication Data
US 2007/0108941 A1    May 17, 2007

(30) Foreign Application Priority Data
Nov. 17, 2005    (JP)    ............................. 2005-333283

(51) Int. Cl.
*H02J 7/00*    (2006.01)
(52) U.S. Cl. ........................ 320/112; 320/124; 320/134; 320/136; 324/433
(58) Field of Classification Search ................. 320/116, 320/133, 134, 136, 112, 124, 135; 324/427, 324/433, 434
See application file for complete search history.

(56) References Cited

U.S. PATENT DOCUMENTS

| 5,493,197 A | 2/1996 | Eguchi et al. ................... 320/5 |
| 6,268,710 B1 * | 7/2001 | Koga .......................... 320/116 |
| 6,329,795 B1 | 12/2001 | Nakashimo ................. 320/134 |
| 6,998,818 B2 * | 2/2006 | Xiong et al. ................. 320/134 |
| 7,408,325 B2 * | 8/2008 | Yamamoto et al. .......... 320/133 |
| 2001/0017534 A1 | 8/2001 | Haraguchi et al. .......... 320/134 |

(Continued)

FOREIGN PATENT DOCUMENTS

EP    0588613    3/1994

(Continued)

OTHER PUBLICATIONS

European Search Report dated Apr. 4, 2007.

*Primary Examiner*—Akm E Ullah
*Assistant Examiner*—Arun Williams
(74) *Attorney, Agent, or Firm*—Edwards Angell Palmer & Dodge LLP (57) ABSTRACT

A battery pack for a power tool has a less-current consuming over-discharge protection. The battery pack includes a battery stack composed of a plurality of series connected secondary cells, and a discharge detector configured to monitor a cell voltage across each of the secondary cells and to provide a discharge stop signal when any one of the cell voltages becomes lower than a predetermined threshold. The discharge stop signal is fed to deenergize the power tool. The discharge detector is composed of a voltage monitor and a power controller. The voltage monitor includes a plurality of comparators and a plurality of constant voltage elements each providing a constant voltage determining the threshold. Each comparator is configured to compare each cell voltage with the threshold to give a comparison result. The voltage monitor is energized by the battery stack to provide the discharge stop signal based upon the comparison results. The power controller is configured to energize the voltage monitor when the battery pack is connected to the power tool. Thus, the discharge detector is protected from consuming the energy of the battery pack while being disconnected from the power tool.

4 Claims, 4 Drawing Sheets

U.S. PATENT DOCUMENTS

2005/0077878 A1    4/2005   Carrier et al. ............... 320/134
2006/0255769 A1*  11/2006   Liu et al. ................... 320/134

FOREIGN PATENT DOCUMENTS

| EP | 1594209 | 11/2005 |
|----|---------|---------|
| JP | 2005-131770 | 5/2005 |
| JP | 2005-218174 | 8/2005 |

* cited by examiner

RECHARGEABLE BATTERY PACK FOR A POWER TOOL INCLUDING OVER-DISCHARGE PROTECTION

BACKGROUND OF THE INVENTION

1. Field of the Invention

The present invention is directed to a rechargeable battery pack for a power tool, and is more particularly to a battery pack with an over-discharge protection.

2. Description of the Related Art

A rechargeable battery pack has been widely utilized for a power tool. Recently, a lithium-ion battery has been becoming prevalent over conventional nickel-cadmium and nickel-hydrogen batteries because of its high power generating capability and also of a light weight structure. In order to safely utilize the lithium-ion battery for the power tool, it is required to make a protection against over-discharging of the battery, the lithium-ion battery is especially susceptible to over-discharging and may rapidly deteriorate by over-discharging.

In order to avoid the over-discharging, Japanese Patent Publication JP 2005-218174 and JP2005-131770 propose a combination of a battery pack and a power tool.

The battery pack has a battery stack composed of a series connected secondary cells, and incorporates a voltage monitor which is configured to monitor a cell voltage across each one of the secondary cells to provide a detection signal indicative of the cell voltage to the power tool having a motor energized by the battery stack. The power tool includes a controller which controls a discharge current from the battery stack to the motor. The controller is configured to stop feeding the discharge current in an event that the detection signal indicates the over-discharging of the cells. In this connection, the battery pack is required to include a discharge detector which detects and outputs a discharge stop signal to the controller when any one of the secondary cells is over-discharged. Although the discharge detector is only required to operate while the battery pack is connected to the power tool for operating the power tool, it consumes a certain current from the battery stack while it is left disconnected from the power tool because of the necessity of checking the cell voltage of each secondary cell. With this consequence, the battery pack may be exhausted while it is left disconnected from the power tool for a long period of time, thereby eventually deteriorating the secondary cells.

SUMMARY OF THE INVENTION

In view of the above problem, the present invention has been accomplished to provide a rechargeable battery pack for a power tool which is capable of avoiding an over-discharging when connected to operate the power tool, yet being protected from being exhausted while it is left disconnected from a charger. The battery pack in accordance with the present invention includes a battery stack composed of a plurality of series connected secondary cells, a pair of power output terminals connected across the battery stack to supply a voltage of the battery stack for operating the power tool, and a signal connector configured to include a charge control terminal, a discharge control terminal, and a signal ground terminal connected to a circuit ground. The battery pack includes a charge detector which is configured to monitor a cell voltage appearing across each of the secondary cells and to provide a high charge-control signal when all of the cell voltages are lower than a first threshold ($V_{TH1}$) and a low charge-control signal when any one of the cell voltage becomes higher than the first threshold ($V_{TH1}$). The high charge-control signal and the low charge-control signal are fed through the charge control terminal to a battery charger for regulating a charge current of charging the secondary cells. The battery pack also includes a discharge detector which is configured to monitor the cell voltage across each of the secondary cells and to provide a discharge stop signal when any one of the cell voltages becomes lower than a second threshold ($V_{TH2}$) which is lower than said first threshold ($V_{TH1}$). The discharge stop signal is fed through the discharge control terminal to the power tool for deenergizing the power tool. The discharge controller comprises a voltage monitor and a power controller. The voltage monitor is configured to include a plurality of comparators and a plurality of constant voltage elements each providing a constant voltage that defines the second threshold ($V_{TH2}$). Each of the comparators is configured to compare each of the cell voltages with the second threshold to give a comparison result. The voltage monitor is configured to be energized by the battery stack and to provide the discharge stop signal to the charge control signal based upon the comparison results. The power controller is configured to energize the voltage monitor upon the battery pack being connected to the power tool. Accordingly, the discharge detector is protected from consuming the energy of the battery pack while being disconnected from the power tool, thereby assuring a long battery life while retaining an advantage of protecting the battery pack from being over-discharged during the use of the power tool.

Preferably, the power controller is configured to have a plurality of different current supply paths which supply a current from a common potential of the battery stack respectively to different potentials of the battery stack through each one of the constant voltage sources. Each of the current supply paths includes a switch which is configured to close only in response to a detection signal issued when the battery pack is connected to the power tool. Accordingly, no leak current flows across each of the secondary cells while the battery pack is left disconnected from the power tool, whereby it is possible to keep the voltage monitor disconnected entirely from the battery stack, assuring to consume no substantial power of the battery pack when the battery pack is left disconnected from the power tool.

Preferably, the discharge detector includes a delay circuit which delays the discharge stop signal by a predetermined time from the detection that anyone of the cell voltages becomes lower than the second threshold. With the provision of the delay circuit, it is possible to exclude a noise which would otherwise cause an erroneous control.

The power output terminals are composed of a positive output terminal and a ground terminal which is preferably isolated electrically from the circuit ground such that the charge current or discharge current can be well prevented from flowing even if the electrical connection between the battery pack and the charger or the power tool should failed.

DETAILED DESCRIPTION OF EXEMPLARY EMBODIMENTS

Figure 1:
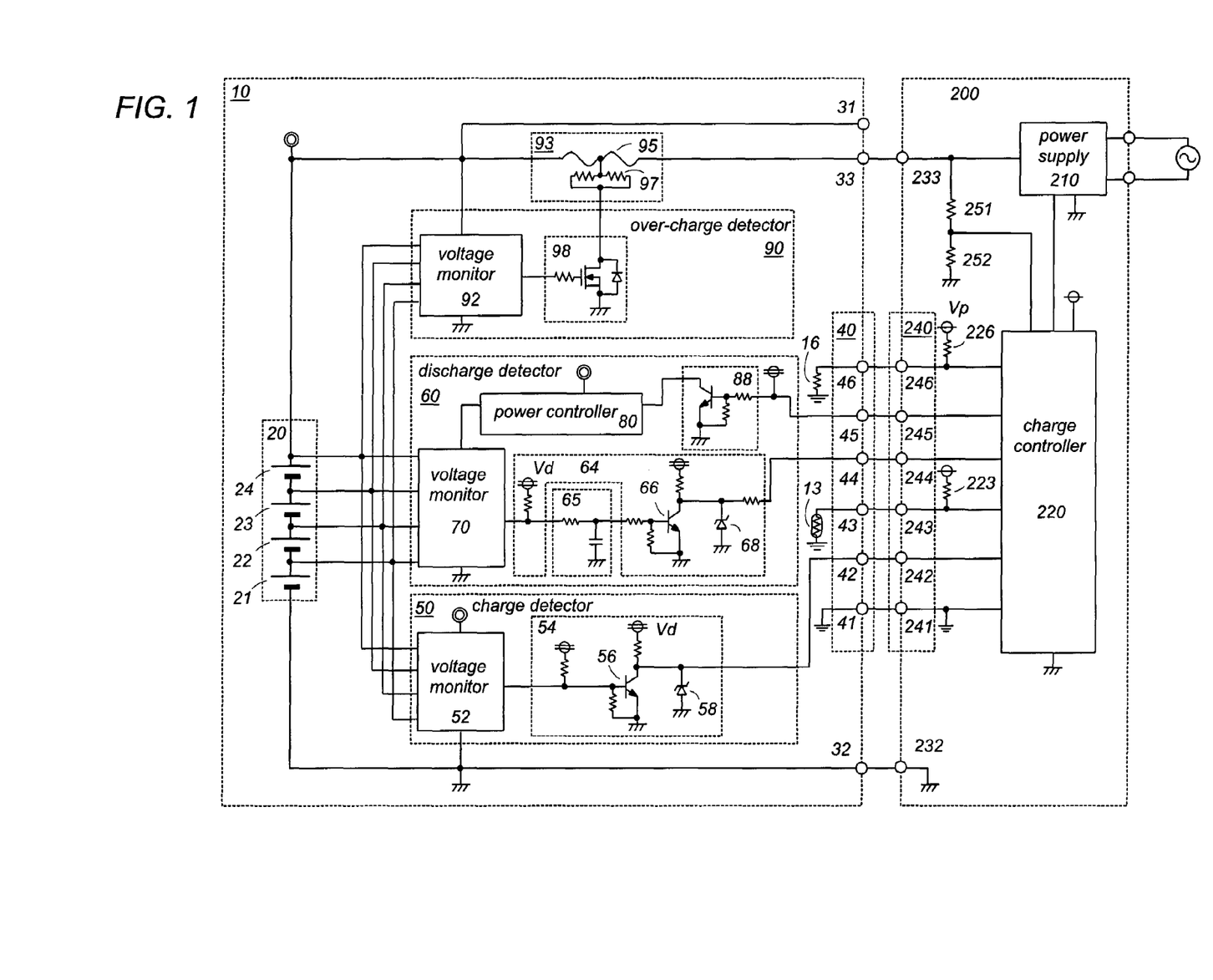
FIG. 1 is a circuit diagram of a battery pack for a power tool in accordance with a preferred embodiment of the present invention shown as being connected an associated charger.
Figure 2:
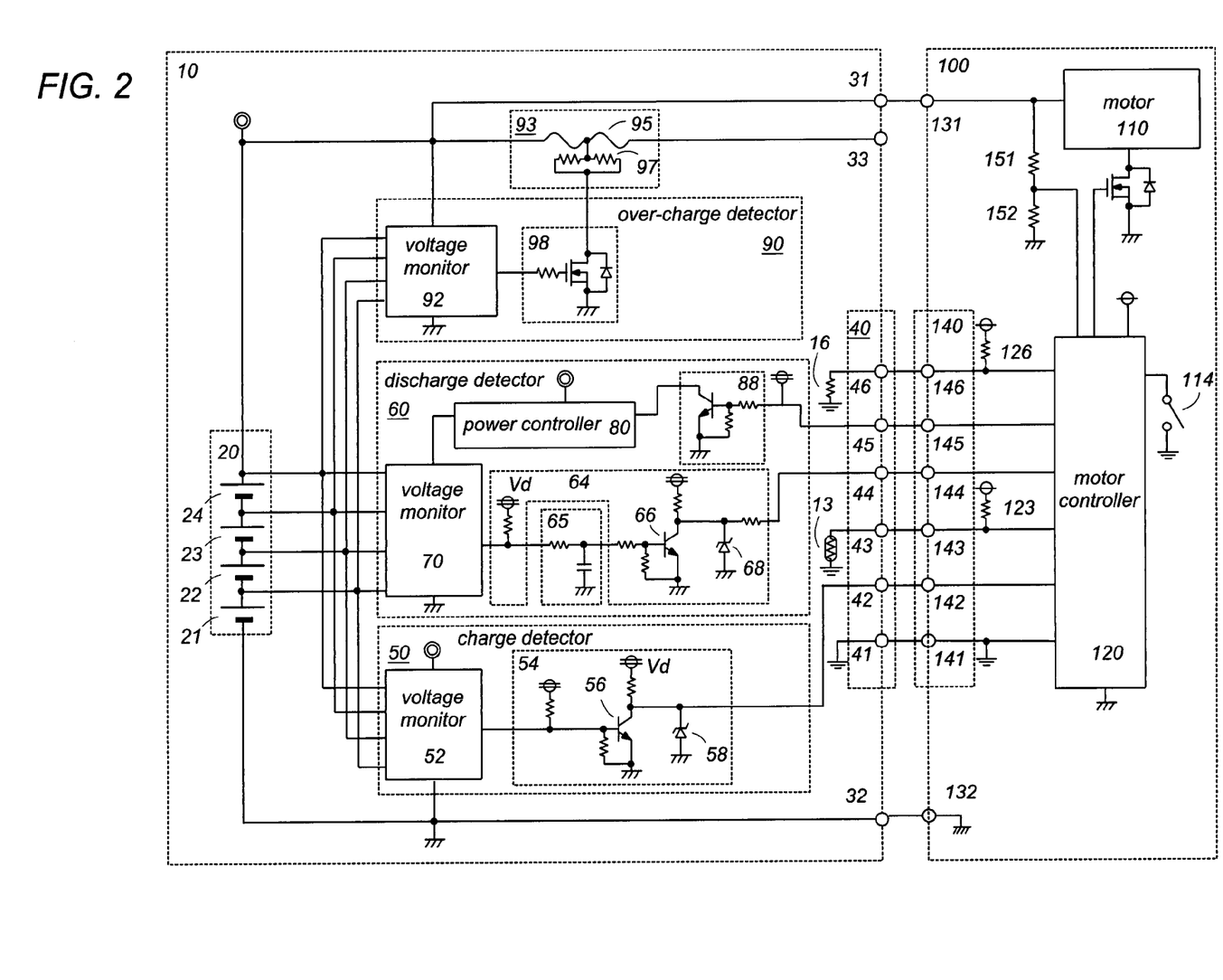
FIG. 2 is a circuit diagram of the battery pack shown as being connected to the power tool.

Referring now to FIGS. 1 and 2, there is shown a battery pack for a power tool in accordance with an exemplary embodiment of the present invention. The battery pack 10 has a casing which is detachable to the power tool 100 and to a charger 200. The casing accommodates therein a battery stack 20 composed of a plurality of series-connected lithium-ion secondary cells 21 to 24, and carries a pair of power terminals 31 and 32, a charge terminal 33, and a signal connector 40 for connection with the power tool 100 and the charger 200. The power terminals is composed of a positive output terminal 31 and a ground terminal 32 which are connected across the battery stack 20 to supply a discharge current to the power tool 100, while the charge terminal 33 and the ground terminal 32 are connected across the battery stack 20 to receive a charge current from the charger 200. The charge terminal 33 is separated from the positive output terminal 31 so that the battery stack 20 receives the charge current not through the positive output terminal 31.

The battery pack 10 includes a charge detector 50, a discharge detector 60, and an over-charge detector 90 which are configured to detect a cell voltage of each secondary cell 21 to 24 for control of regulating the charge current from the charger, prohibiting the discharge from the battery stack 20 upon detection of an over-discharge condition, and protecting the battery stack 20 from being over-charged, as will be discussed later.

The signal connector 40 includes, in addition to a signal ground terminal 41 connected to a circuit ground common to the detectors 50, 60, and 90, a charge control output terminal 42, a temperature output terminal 43, a discharge control output terminal 44, a trigger input terminal 45, and an ID output terminal 46. The charge control output terminal 42 is provided to output a charge control signal from the charge detector 50. The charge control signal is received at the charger 200 for regulating the charge current being supplied from the charger 200 to the battery stack 20. A temperature sensing element 13 is connected across the temperature output terminal 42 and the circuit ground to give a temperature of the battery stack 20. The discharge control output terminal 44 is provided to output a discharge stop signal from the discharge detector 60 upon detection of the over-discharging condition. The discharge stop signal is fed to the power tool 100 in order to deenergize the power tool 100, i.e., stop feeding the discharge current to the power tool 100 for protection of the secondary cells. The trigger input terminal 45 is provided to receive a trigger signal from the power tool 100 as well as from the charger 200 to start operating the discharge detector 60. An ID resistor 16 is connected across the ID output terminal 46 and the circuit ground to give a specific resistance indicative of the kind of the battery pack 10 which is taken in the power tool 100 and the charger 200 for identification of the battery pack 10. The kind of the battery pack 10 includes the number of the secondary cells and the individual capacity thereof.

The charger 200 includes a power supply 210 which converts an input AC voltage into a DC voltage for supplying the charge current to the battery stack 20, and a charge controller 220 which controls the charge current. The charge current is supplied through a charge terminal 233 and a ground terminal 232 in contact respectively with charge terminal 33 and the ground terminal 32 of the battery pack 10. The charger 200 is equipped with a signal connector 240 which are detachable to the signal connector 40 of the battery pack 10 for receiving and sending signals through terminals 241 to 246 from and to the battery pack 10.

The power tool 100 includes an electric motor 110 as a driving source of the power tool, a trigger switch 114 to be manipulated by a user, and a motor controller 120 for controlling the motor 110. The motor 110 is energized by a discharge current supplied from the battery stack 20 through a power terminal 131 and a ground terminal 132 in contact respectively with the positive output terminal 31 and the ground terminal 32 of the battery pack 10. The power tool 100 is equipped with a signal connector 140 which are detachable to the signal connector 40 of the battery pack 10 for receiving and sending signal through the terminals 141 to 146 from and to the battery pack 10.

The charge detector 50 is configured to detect the cell voltage across each one of the secondary cells 21 to 24 so as to provide a high charge-control signal when all of the cell voltages are lower than a first threshold ($V_{TH1}$), for example, 4.2V, and a low charge-control signal when any one of the cell voltages becomes higher than the first threshold ($V_{TH1}$). The charge-control signal is fed through terminals 42 and 242 to the charge controller 220 which regulates to supply a high charge current in response to the high-charge control signal, and a low charge current in response to low charge control signal. After receiving the low charge control signal, the charge controller 220 operates to reduce the charge current gradually while monitoring the overall voltage of the battery stack 20 by means of a voltage divider of resistors 251 and 252 provided in the charger 200. The charge controller 220 stops supplying the charge current when the overall voltage of the battery stack 20 becomes higher than a predetermined limit, for example, 17.5 V.

The charge detector 50 includes a first voltage monitor 52 which detects the cell voltage across each one of the secondary cells 21 to 24, compares each cell voltage with the first threshold ($V_{TH1}$), and provides a H-level output when any one of the cell voltages is higher than the first threshold, and otherwise provides a L-level output. The output from the first voltage monitor 52 is fed to a signal interface 54 which is composed of a switching transistor 56 and a zener diode 58 to give the high charge-control signal of H-level to the charge control output terminal 42 in response to the L-level output from the first detector 52, and to give the low charge-control signal of L-level in response to the H-level output from the first detector 52. The first voltage monitor 52 is constituted by an integrated circuit, and is configured to consume a less current of as less as 1 μA from the battery stack 20. While, on the other hand, the signal interface 54 is energized by a voltage Vd available only when the battery pack 10 is connected to the charger 200.

The charge controller 220 of the charger 200 is configured to start charging the battery stack 20 upon recognizing the connection of the battery pack 10 to the charger 200, and stop the charging upon detachment of the battery pack 10. For this purpose, the charger 200 is configured to generate a pull-up voltage Vp which is applied to the terminals 243 and 246 respectively through pull-up resistors 223 and 226. When the signal connector 40 of the battery pack 10 is connected or disconnected to and from the signal connector 240 of the charger 200, the voltages at terminals 243 and 246 vary due to the connection or disconnection through terminals 43 and 46 respectively to and from the temperature sensing element 13 and the ID resistor 16. Based upon the voltage variation, the charge controller 120 acknowledges the connection and disconnection of the battery pack 10 to start and stop the charging. Also, the charge controller 120 is configured to permit the charging only when the temperature detected by the temperature sensing element 13 is below a predetermined temperature, for example, 70° C. Further, the charge controller 120 is configured to select the level of the charge current and/or charging rate thereof in accordance with the kind of the battery stack 20 identified by the voltage signal from the ID resistor 146.

The discharge detector 60 incorporated in the battery pack 10 is configured to detect the cell voltage across each one of the secondary cells 21 to 24 and to provide a discharge stop signal when any one of the cell voltages becomes lower than a second threshold ($V_{TH2}$), for example, 2.0 V lower than the first threshold ($V_{TH1}$). The discharge stop signal, which is indicative of the over-discharging of the battery stack 20, is fed through terminals 44 and 144 to the motor controller 120 of the power tool 100 in order to stop driving the motor 110, i.e., stop deriving the discharge current from the battery stack 20. The discharge detector 60 includes a second voltage monitor 70 configured to detect the cell voltage across each one of the secondary cells 21 to 24 to compare each cell voltage with the second threshold ($V_{TH2}$) and to provide a L-level output when any one of the cell voltage is lower than the second threshold ($V_{TH2}$), and otherwise provide a H-level output. The output of the second voltage monitor 70 is fed through a delay circuit 65 to a signal interface 64 which is composed of a switching transistor 66 and a zener diode 68 to give the discharge stop signal of H-level to the discharge control output terminal 44 in response to the L-level output from the voltage monitor 70. The delay circuit 65 is composed of a capacitor and a resistor to delay the output from the detector 70, and therefore the output of the signal interface 64 by a predetermined time to eliminate possible noises for reliable detection of the over-discharging.

Prior to explaining the details of the discharge detector 60, it is mentioned that the power tool 100 includes a voltage divider of resistors 151 and 152 for monitoring the overall voltage being supplied from the battery stack 20. Upon closure of the trigger switch 114 with the battery pack 10 being connected to the power tool 100, the motor controller 120 provides an enable signal to the terminal 145 which is fed through trigger input terminal 45 as the trigger signal for activating the discharge detector 60. While the voltage applied to the terminal 143 indicates that the temperature of the battery stack 20 is below the predetermined limit, the motor controller 120 activates the motor 110 and keep activating it unless receiving the discharge stop signal from the discharge detector 60. The motor controller 120 is also configured to stop the motor 110 when the overall voltage of the battery stack 20 as monitored by the voltage divider on the side of the power tool 100 is lowered below a predetermined level, for example, 10 V, as a result of the over-discharging. The predetermined voltage is known from the voltage signal of the ID resistor 16 received at the terminal 146.

The discharge detector 60 further includes a power controller 80 which energizes the second voltage monitor 70 only in response to the trigger signal received at the terminal 45 from the motor controller 120. The trigger signal is fed to a driver 88 of the power controller 80 such that the power controller 80 is activated to energize the second voltage monitor 70, i.e., connect the second voltage monitor 70 to the battery stack 20. The like enable signal is also fed from the charge controller 220 when the battery pack 10 is connected to the charger 200.

Figure 3:
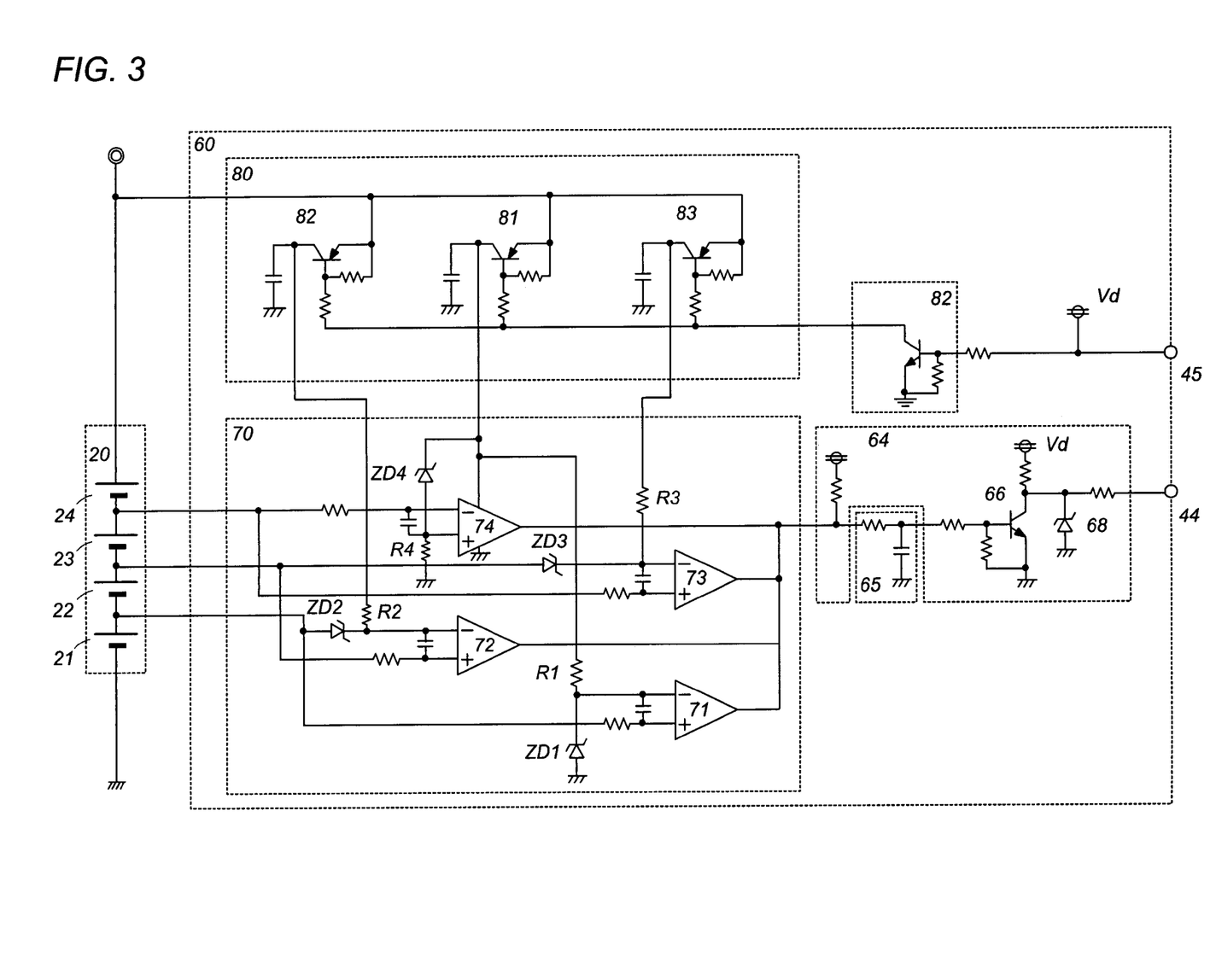
FIG. 3 is a circuit diagram of a discharge detector incorporated in the above battery pack.

As shown in FIG. 3, the second voltage monitor 70 is configured to include a plurality of comparators 71 to 74, and a plurality of zener diodes ZD1 to ZD4 each generating the second threshold ($V_{TH2}$) and connected to an input of each associated one of the comparators 71 to 74. Each of the comparators 71 to 74 are connected in circuit to compare the cell voltage of each one of the secondary cells 21 to 24 with the second threshold ($V_{TH2}$) given by each of the zener diodes ZD1 to ZD4. The power controller 80 includes a plurality of switching transistors 81 to 83 which have individual bases commonly connected to the driver 88 so as to turn on simultaneously in response to the trigger signal. The switching transistors 81 to 83 have individual collectors commonly connected to the positive end of the battery stack 20 so as to give different current supply paths, i.e., a first path extending through first transistor 81 and the zener diode ZD1 to the ground, a second path extending through the second transistor 82 and the zener diode ZD2 to a node between the secondary cells 21 and 22, a third path extending through the third transistor 83 and the zener diode ZD3 to a node between the secondary cells 22 and 23, and a fourth patch extending through the first transistor 81 and the zener diode ZD4 to the circuit ground. The first transistor 81 is also connected to give an operating voltage to the comparators 71 to 74 integrated into a quad-comparator. Thus, the power controller 80 energizes the voltage monitor 70, i.e., supply the current from the battery stack 20 only in response to the trigger signal, thereby generating the second threshold ($V_{TH2}$) across each of the zener diodes ZD1 to ZD4. This means that the voltage monitor 70 does not consume the current when the battery pack 10 is left detached from the power tool 100 or the charger 200. It is noted in this connection that since the voltage monitor 70 of the discharge detector 60 consumes about 1.0 mA due to the circuit design of using the quad-comparator and the individual zener diodes, which is quite higher than the current that is normally consumed at the first voltage monitor 52 of the charge detector 50, the power controller 80 is required to reduce the amount of idle currents when the battery pack 10 is left disconnected from the power tool or the charger. However, a like power controller 80 may be incorporated also in the charge detector 50 to minimize the idle current.

The first comparator 71 has its non-inverting input connected to the node between the secondary cells 21 and 22, and has its inverting input connected to the zener diode ZD1 so as to provide a L-level output when the cell voltage of the secondary cell 21 is lower than the second threshold ($V_{TH2}$) given by the zener diode ZD1. The second comparator 72 has its non-inverting input connected to the node between the secondary cells 22 and 23, and has its inverting input connected to the node between the secondary cells 21 and 22 through the zener diode ZD2 so as to provide a L-level output when the cell voltage of the secondary cell 22 is lower than the second threshold ($V_{TH2}$). Likewise, the third comparator 73 has its non-inverting input connected to the node between the secondary cells 23 and 24, and has its inverting input connected to the node between the secondary cells 22 and 23 through the zener diode ZD3 so as to provide a L-level output when the cell voltage of the secondary cell 23 is lower than the second threshold ($V_{TH2}$). The fourth comparator 74 has its non-inverting input connected to the positive pole of the battery stack 20 through the zener diode ZD4 and its inverting input connected to the node between the secondary cells 23 and 24 so as to provide a L-level output when the cell voltage of the secondary cell 24 is lower than the second threshold ($V_{TH2}$) given by the zener diode ZD4. These comparators 71 to 74 are connected in parallel with each other so that the signal interface 64 receives the L-level output and provides the H-level discharge stop signal when any one of the comparator provides the L-level output. Otherwise, the signal interface 64 receives the H-level output and in turn provides the L-level output, enabling to discharge the battery stack 20 for continued operation of the power tool 100.

Figure 4:
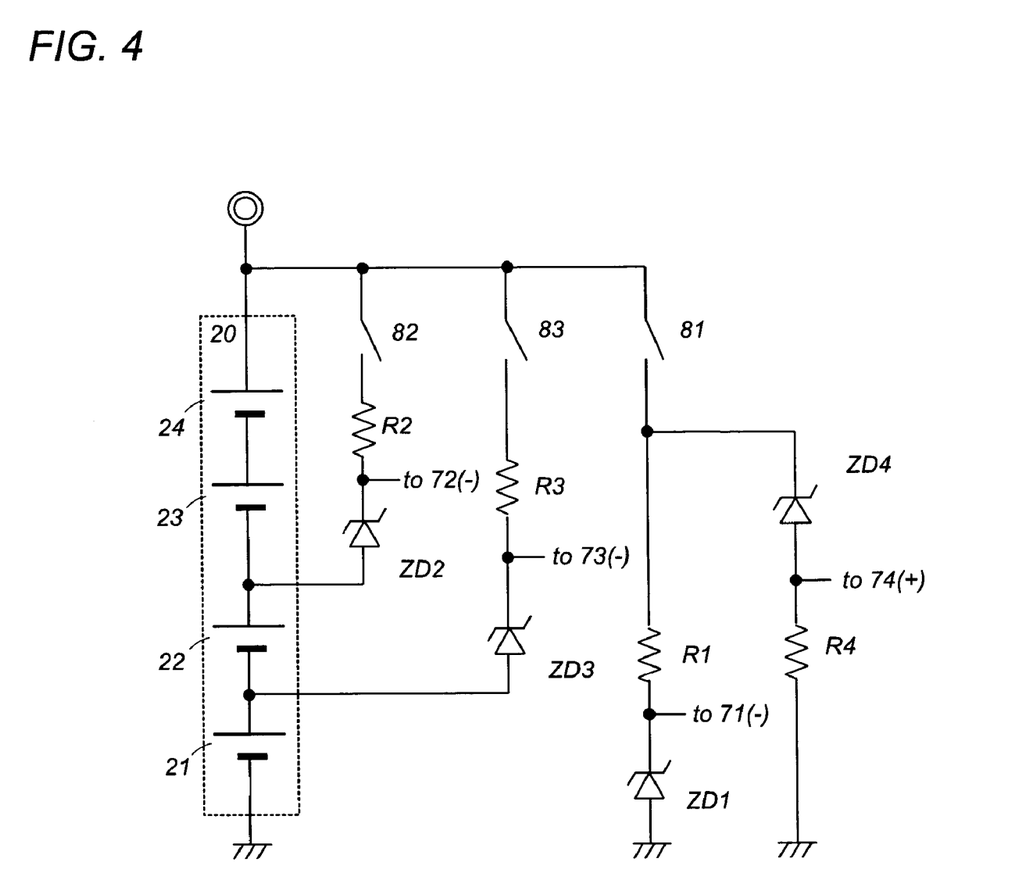
FIG. 4 is a schematic diagram illustrating different current flow paths in the above discharge detector.

As schematically shown in FIG. 4, since the switching transistors 81 to 83 give the different current paths extending from the positive terminal of the battery stack 20 respectively to the ground, the different nodes or potentials between the different adjacent pairs of the secondary cells, and also since the zener diodes are inserted respectively in the different current paths to give the second threshold ($V_{TH2}$) to the associated comparators, no leak current flows across each of the secondary cells 21 to 24 to thereby avoid unnecessary discharging the battery stack 20. Further, each of the zener diodes ZD1 to ZD4 is supplied with the combined voltage of at least two of the secondary cells 21 to 24, it is possible to apply a sufficient voltage across each zener diode even when the cell voltage of any one of the secondary cells is lowered, thereby assuring reliable detection of each cell voltage. In this regard, resistors R1 to R4, which are connected in series respectively with zener diodes ZD1 to ZD4 in the individual current flow paths, are so adjusted to flow a constant current to zener diodes ZD1 to ZD4 for consistent and reliable detection of the cell voltage of each secondary cells 21 to 24.

When the battery pack 10 is connected to the charger 200, the charge controller 220 generates and feeds the trigger signal to the driver 88 of the power controller 80 to energize the second voltage monitor 70. When the discharge stop signal is acknowledged through the terminals 44 and 144 even under a condition that the overall voltage of the battery stack 20 becomes higher than a predetermined level as indicative of that the battery stack 20 is charged sufficiently, the charge controller 220 stops the charging and issues an alert signal indicative of the occurrence of abnormal discharging during the charging. The alert signal is processed to notify the event by means of suitable display or sound. When the charging is completed or stopped, the charge controller 220 provides no trigger signal, thereby deactivating the first voltage monitor 70 through the power controller 80 for minimizing the current consumption on the side of the battery pack 10.

Turning back to FIG. 1, the battery pack 10 further includes an over-charge detector 90 which is configured to stop the inflow of the charge current when the cell voltage of any one of the secondary cells 21 to 24 becomes higher than a third threshold ($V_{TH3}$), for example, 4.5 V higher than the first threshold ($V_{TH1}$) for protection of the battery stack 20 in an event that the charge controller 220 should fail to stop supplying the charge current. The over-charge detector 90 includes a third voltage monitor 92 which is constantly energized by the battery stack 20 to compare the cell voltage of each one of the secondary cells 21 to 24 with the third threshold ($V_{TH3}$) and provides a H-level output when the cell voltage of any one of the secondary cells 21 to 24 becomes higher than the third threshold ($V_{TH3}$), thereby activating an interrupter 93 by means of a driver 98 so as to open a charge current path from the charger 200 to the battery stack 20. The interrupter 93 includes a non-resettable element 95 in the form of a fusing resistor and a heater 97 which is activated by the driver 88 to melt the element 95 to open the charge current path in an event that any one of the cells is over-charged beyond the third threshold ($V_{TH3}$). Since the interrupter 93 is inserted in the charge current path between the charge terminal 33 and the positive pole of the battery stack 20 as being separated from the discharge current path which is formed between the positive pole of the battery stack 20 and the power terminal 31 to flow the discharge current higher than the charge current, the interrupter 93 is only required to flow the relatively small charge current and can be therefore made compact and less-costly for realizing cost-effective and compact design given to the battery pack 10. The third voltage monitor 92 is designed to consume a current as less as 1 μA.

The ground terminal 32 of the battery pack 10 is separated from the circuit ground, i.e., signal ground terminal 41 of the signal connector 40 such that the discharge current or charge current is prevented from flowing in the charge detector 50, the discharge detector 60, and the over-charge detector 90, if the ground terminal 32 should fail to establish the electrical connection to the ground terminal 132 of the power tool 100, or the ground terminal 232 of the charger 200.

The above embodiment discloses the secondary cells of lithium-ion type as a most preferred application of the present invention in which the second threshold ($V_{TH2}$) is selected to be 2.0 V in consideration of that the lithium-ion cell will deteriorate when the voltage lowers below Fe precipitation voltage (1.0V) or Cu precipitation voltage (0.5V). However, the present invention is not limited to the particular type of the secondary cells and can be equally utilized for other types of the secondary cell. In this regard, the first, second and third thresholds can be suitable selected depending upon the type of the secondary cell.

The invention claimed is:

1. A rechargeable battery pack for a power tool, said battery pack comprising:

a battery stack composed of a plurality of series connected secondary cells;

a pair of power output terminals connected across said battery stack to supply a current from said battery stack for operating said power tool;

a signal connector configured to include a charge control terminal, a discharge control terminal, and a signal ground terminal connected to a circuit ground;

a charge detector configured to monitor a cell voltage appearing across each of said secondary cells and to provide a high charge-control signal when all of the cell voltages are lower than a first threshold ($V_{TH1}$) and a low charge-control signal when any one of the cell voltages becomes higher than said first threshold ($V_{TH1}$), said high charge-control signal and said low charge-control signal being fed through said charge control terminal to a charger for regulating a charge current of charging said secondary cells;

a discharge detector configured to monitor said cell voltage across each of said secondary cells and to provide a discharge stop signal when any one of said cell voltages becomes lower than a second threshold ($V_{TH2}$) which is lower than said first threshold ($V_{TH1}$), said discharge stop signal being fed through said discharge control terminal to said power tool for deenergizing said power tool;

said discharge detector comprising a voltage monitor and a power controller, said voltage monitor comprising a plurality of comparators and a plurality of constant voltage elements each providing a constant voltage which defines said second threshold ($V_{TH2}$), each of said comparators being configured to compare each of said cell voltages with said second threshold to give a comparison result, said voltage monitor being configured to be energized by said battery stack and to provide said discharge stop signal to said discharge control terminal based upon said comparison results, and said power controller being configured to energize said voltage monitor when said battery pack is connected to said power tool.

2. The rechargeable battery pack as set forth in claim 1, wherein
   said power controller is configured to have a plurality of different current supply paths which supply a current from a common potential of said battery stack respectively to different potentials of said battery stack through each one of said constant voltage sources of said voltage detector,
   said power controller having a plurality of switches each of which is inserted in each one of said different current supply paths and is configured to close only in response to a detection signal issued when said battery pack is connected to said power tool.

3. The rechargeable battery pack as set forth in claim 2, wherein
   said discharge detector includes a delay circuit which delays the discharge stop signal by a predetermined time from the detection that anyone of said cell voltages becomes lower than said second threshold.

4. The rechargeable battery pack as set forth in claim 1, wherein
   said power output terminals are composed of a positive output terminal and a ground terminal, said ground terminal being electrically isolated from said signal ground terminal.

* * * * *